April 20, 1954      A. J. KASAK      2,675,850

APPARATUS FOR CLAMPING LINING MATERIAL TO BRAKE SHOES

Filed Jan. 23, 1951      14 Sheets-Sheet 1

INVENTOR
ANTONIN J. KASAK
BY

ATTORNEY

April 20, 1954 A. J. KASAK 2,675,850
APPARATUS FOR CLAMPING LINING MATERIAL TO BRAKE SHOES
Filed Jan. 23, 1951 14 Sheets-Sheet 3

INVENTOR
ANTONIN J. KASAK
BY
ATTORNEY

INVENTOR
ANTONIN J. KASAK
BY
ATTORNEY

INVENTOR
ANTONIN J. KASAK
BY
ATTORNEY

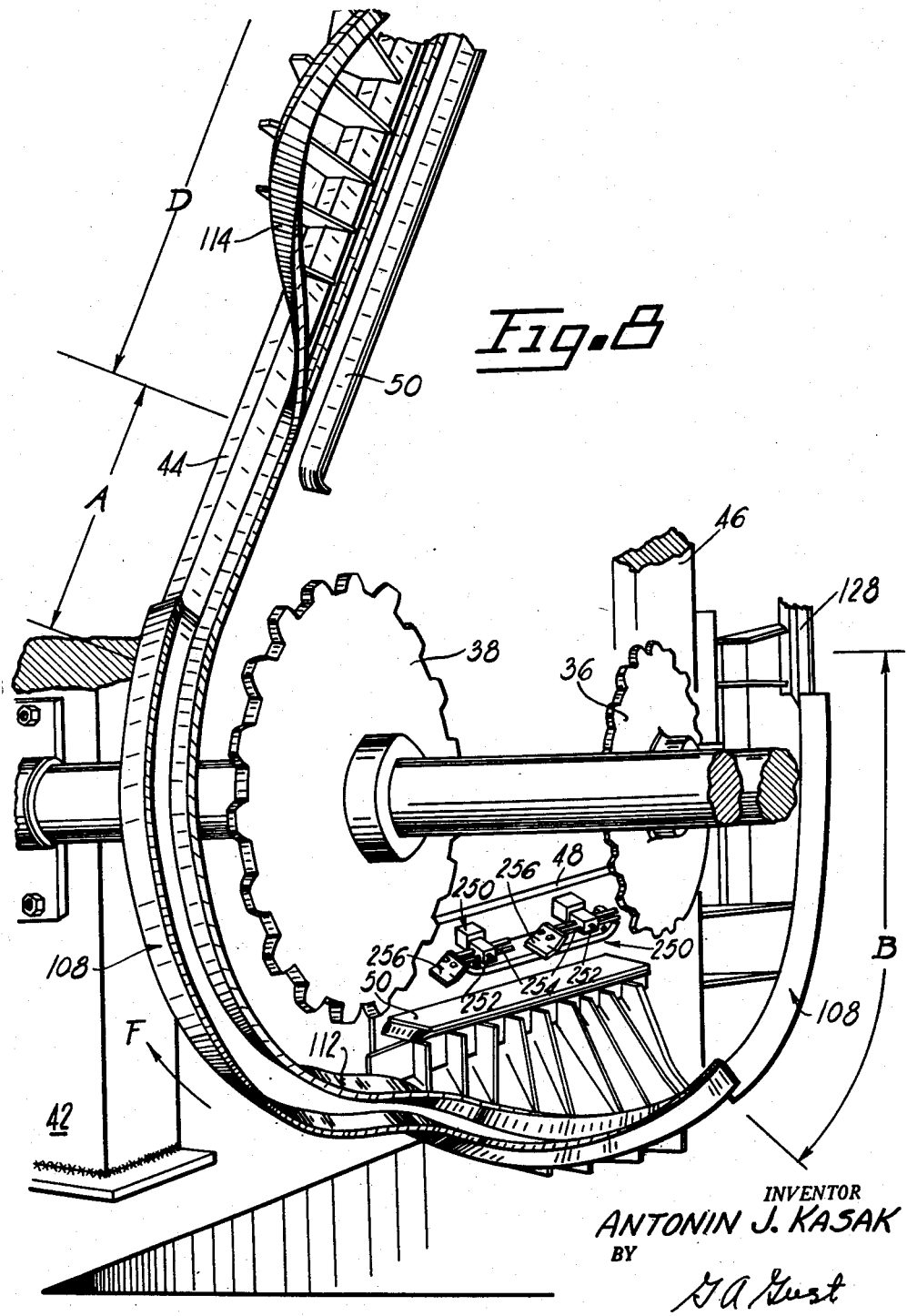

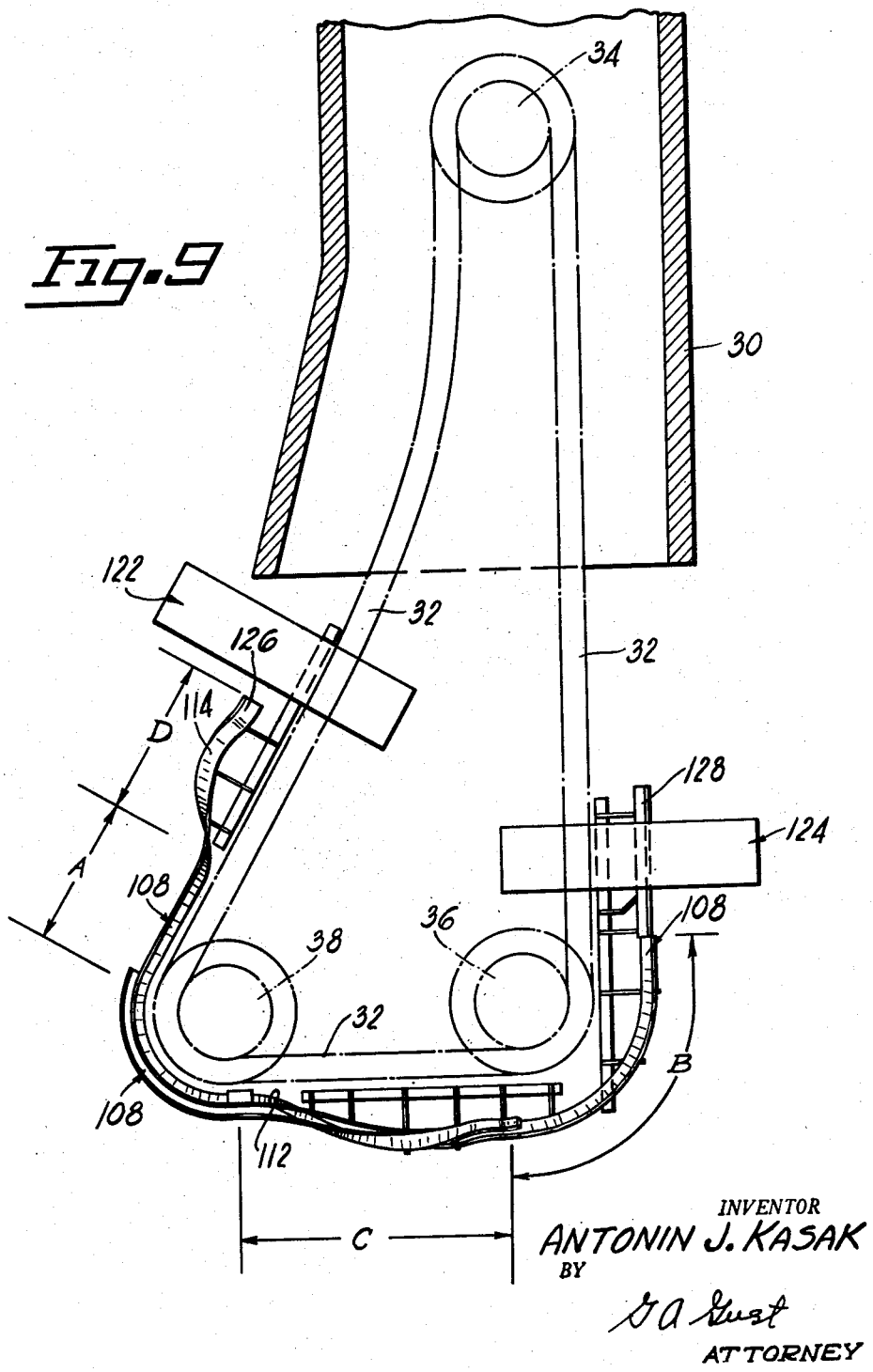

INVENTOR
ANTONIN J. KASAK
BY
G A Gust
ATTORNEY

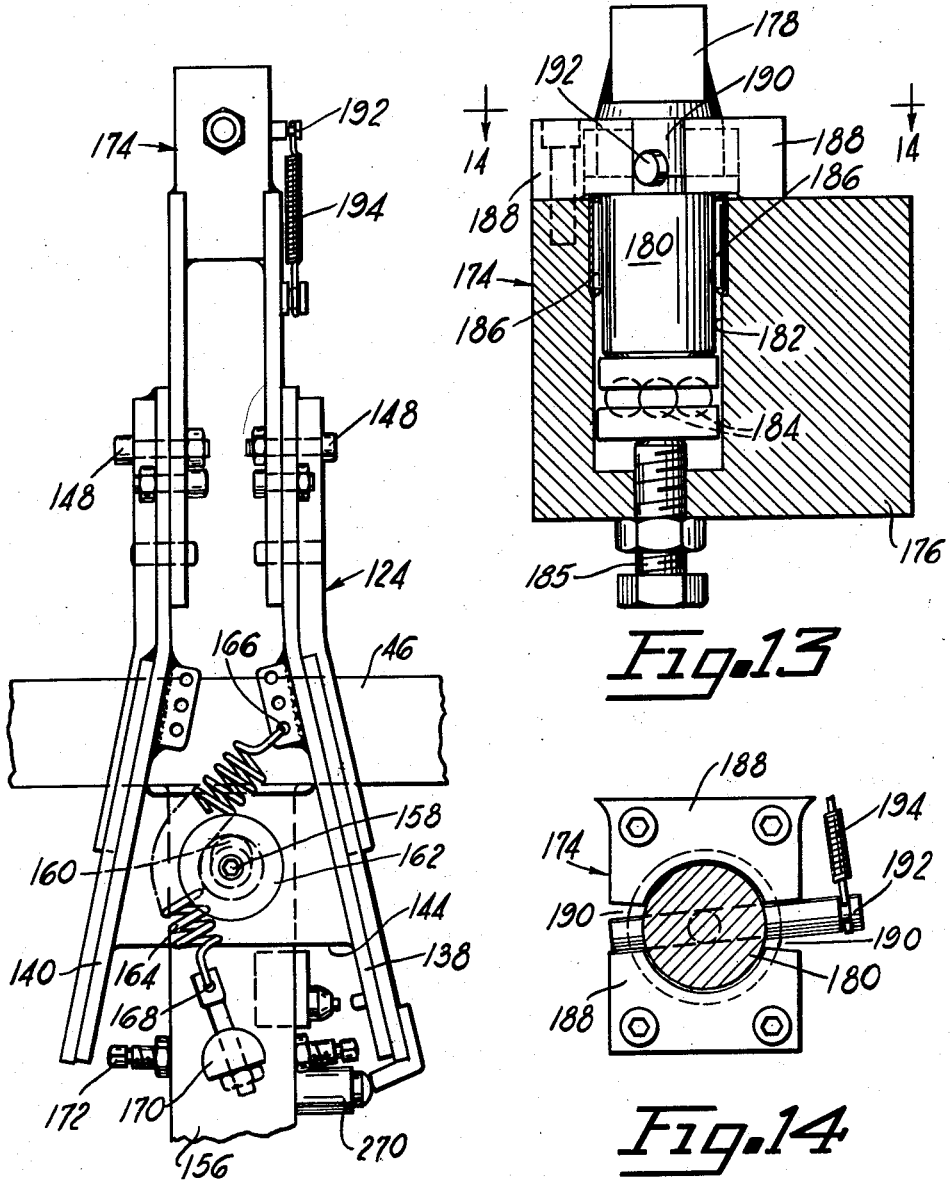

April 20, 1954  A. J. KASAK  2,675,850
APPARATUS FOR CLAMPING LINING MATERIAL TO BRAKE SHOES
Filed Jan. 23, 1951  14 Sheets-Sheet 11
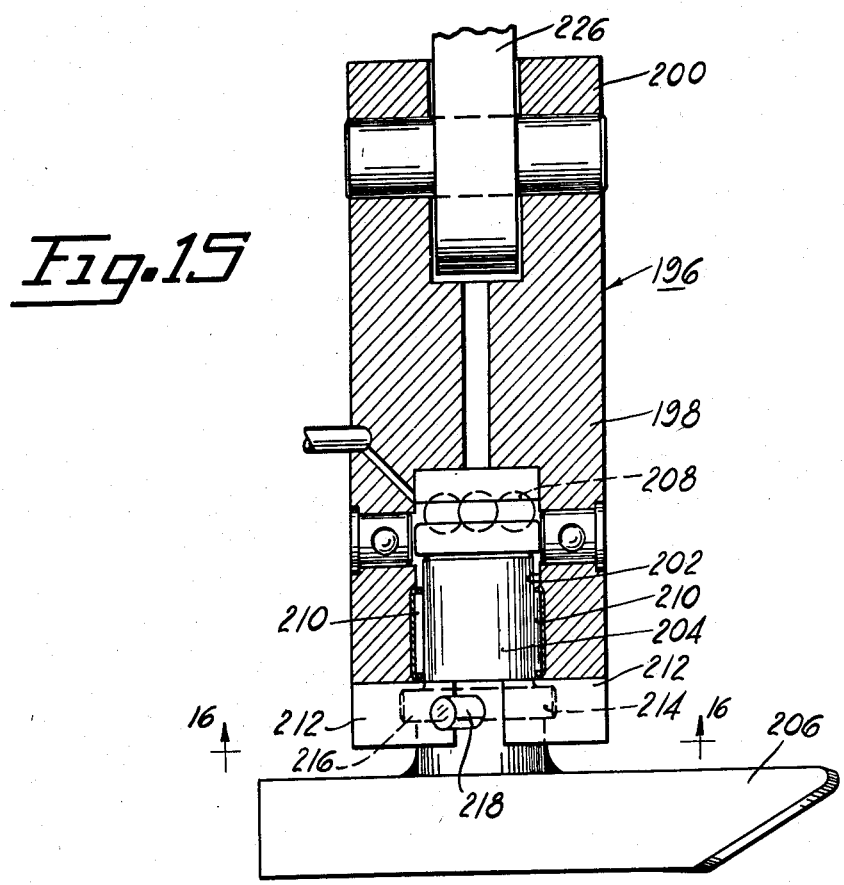
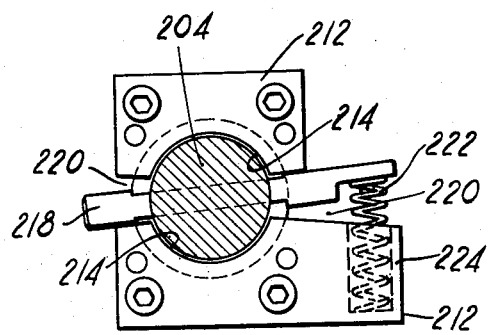
INVENTOR
ANTONIN J. KASAK
BY
*G. A. Gust*
ATTORNEY

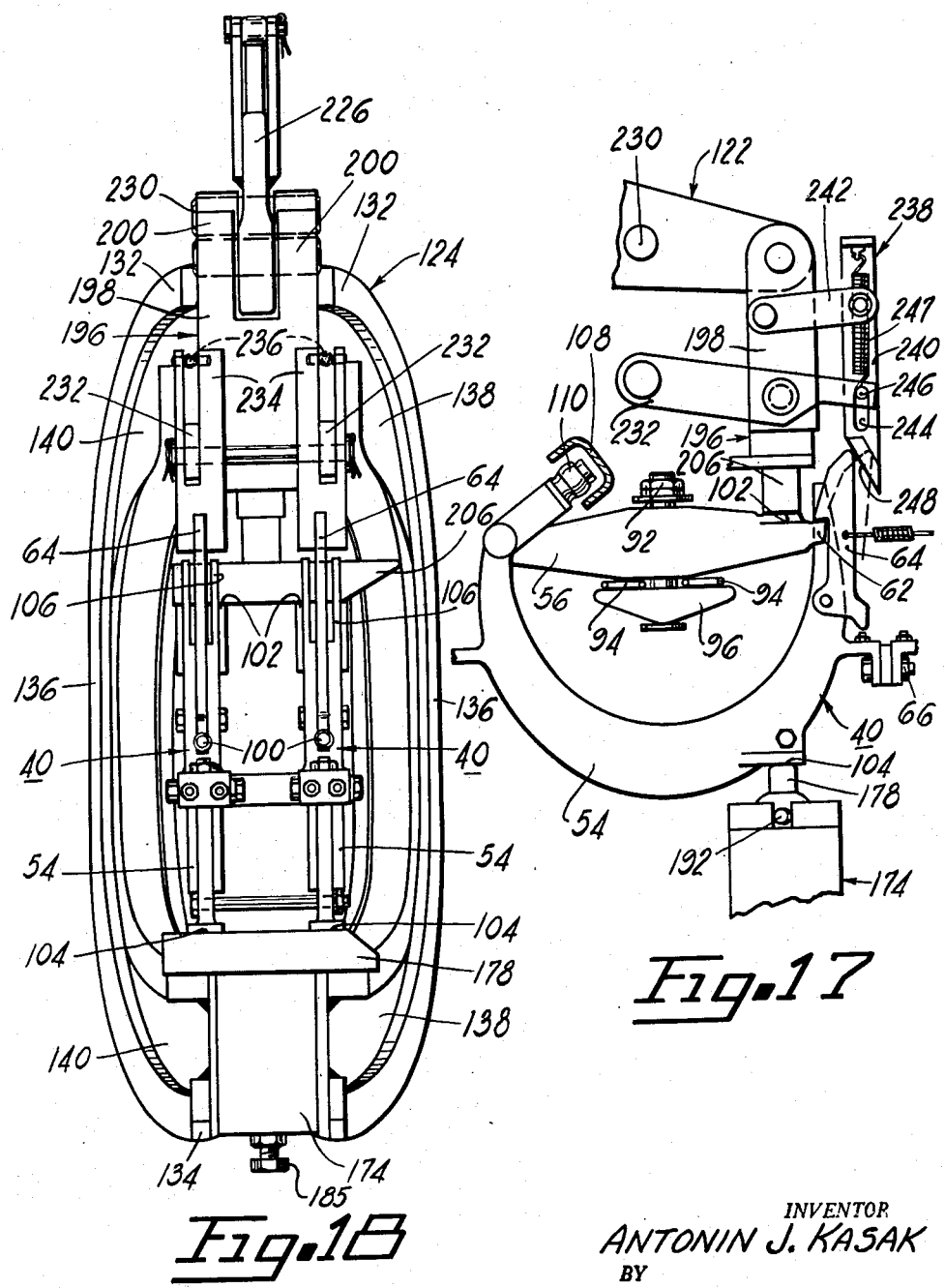

April 20, 1954         A. J. KASAK         2,675,850
APPARATUS FOR CLAMPING LINING MATERIAL TO BRAKE SHOES
Filed Jan. 23, 1951         14 Sheets-Sheet 13
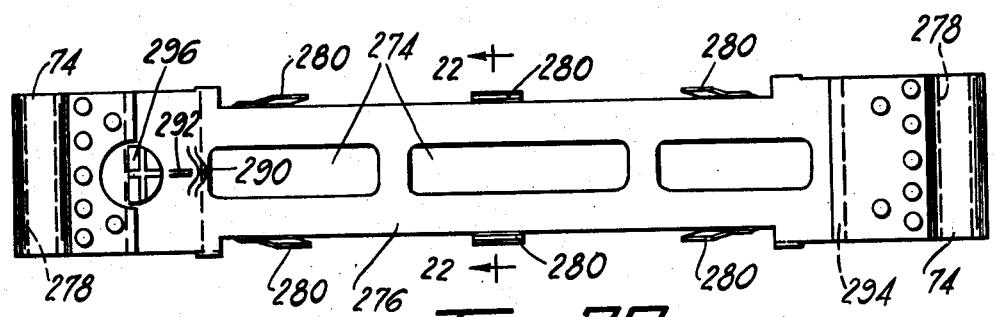
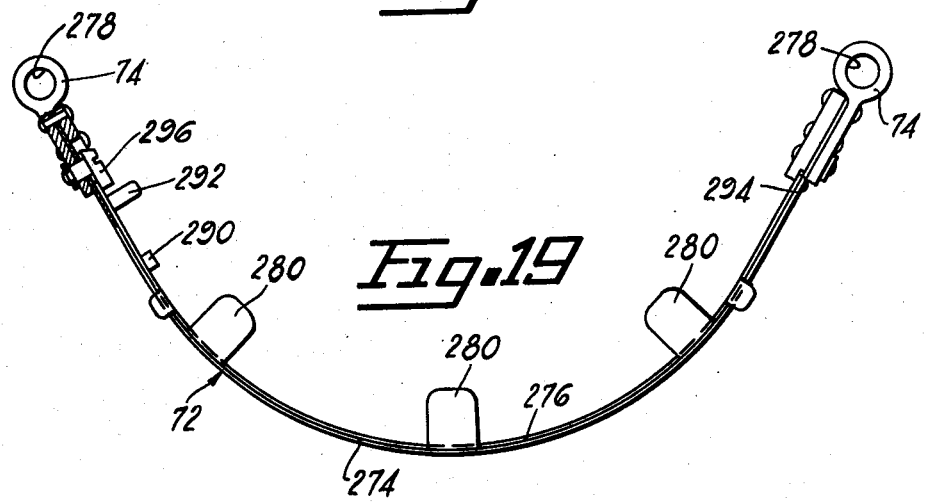
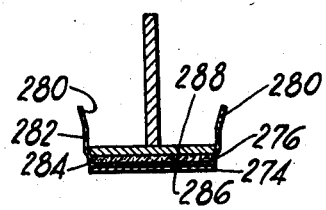
INVENTOR
ANTONIN J. KASAK
BY
ATTORNEY April 20, 1954 A. J. KASAK 2,675,850
APPARATUS FOR CLAMPING LINING MATERIAL TO BRAKE SHOES
Filed Jan. 23, 1951 14 Sheets-Sheet 14

INVENTOR
ANTONIN J. KASAK
BY
ATTORNEY

Patented Apr. 20, 1954

2,675,850

UNITED STATES PATENT OFFICE 2,675,850

APPARATUS FOR CLAMPING LINING MATERIAL TO BRAKE SHOES

Antonin John Kasak, South Bend, Ind., assignor to Bendix Aviation Corporation, South Bend, Ind., a corporation of Delaware Application January 23, 1951, Serial No. 207,374

18 Claims. (Cl. 154—1)

The present invention relates to apparatus useful in bonding brake lining to a brake shoe, and particularly to an apparatus adapted to clamp a brake shoe and lining assembly together under a predetermined pressure during the period of a bonding cycle.

The process generally followed in bonding a brake shoe and lining assembly together includes the steps of coating the faying surface of the lining or shoe with a thermosetting adhesive, clamping the lining and shoe together under a predetermined pressure, and heating the assembly until the adhesive has cured and produced a secure bond. Various devices have been suggested for carrying out these steps, and some have been adopted by industry for mass producing bonded brake shoes. The present invention is directed to providing useful improvements in the mass production of bonded brake shoes and has for its primary object the provision of an apparatus or mechanism which appreciably increases the rate at which such bonded shoes may be produced.

It is another object to provide a combination of mechanism which in one form is capable of clamping a brake shoe and lining assembly together and which in another form is capable of unclamping such an assembly while it is being transported along.

It is another object to provide a power clamp mechanism for latching or unlatching a brake bonding fixture adapted to securely position a brake shoe and lining together.

The bonding fixture per se and in combination with actuating mechanism, as herein disclosed, are claimed in Wesstrom et al. application Serial No. 195,832 filed November 15, 1950.

Still further objects will become apparent as the description proceeds.

In the drawings:

Figure 8 is a fragment of Figure 2 showing the configuration of the cam rail which controls the closing and opening action of the bonding fixtures;

Figure 9 is a side elevation similar to Figure 8 showing certain parts of the complete mechanism in diagram;

Figure 11 is a bottom view of the device of Figure 10;

Figure 13 is a partial longitudinal section of the reaction or lower jaw assembly of the device of Figure 10;

Figure 14 is a section of the lower jaw assembly taken substantially on section line 14—14 of Figure 13;

Figure 15 is a longitudinal section of the pressure or upper jaw assembly of the device of Figure 10;

Figure 16 is a sectional view of the upper jaw assembly taken substantially on section line 16—16 of Figure 10;

Figure 17 is a fragmental view of one power clamping device as it acts on a bonding fixture;

Figure 18 is an end view of two bonding fixtures as they are unclamped by a device of Figure 10;

Figure 19 is a side elevation of the flexible band assembly of a bonding fixture of Figure 6;

Figure 20 is a top view of Figure 19;

Figure 22 is a section taken on section line 22—22 of Figure 20.

General description

Figure 1:
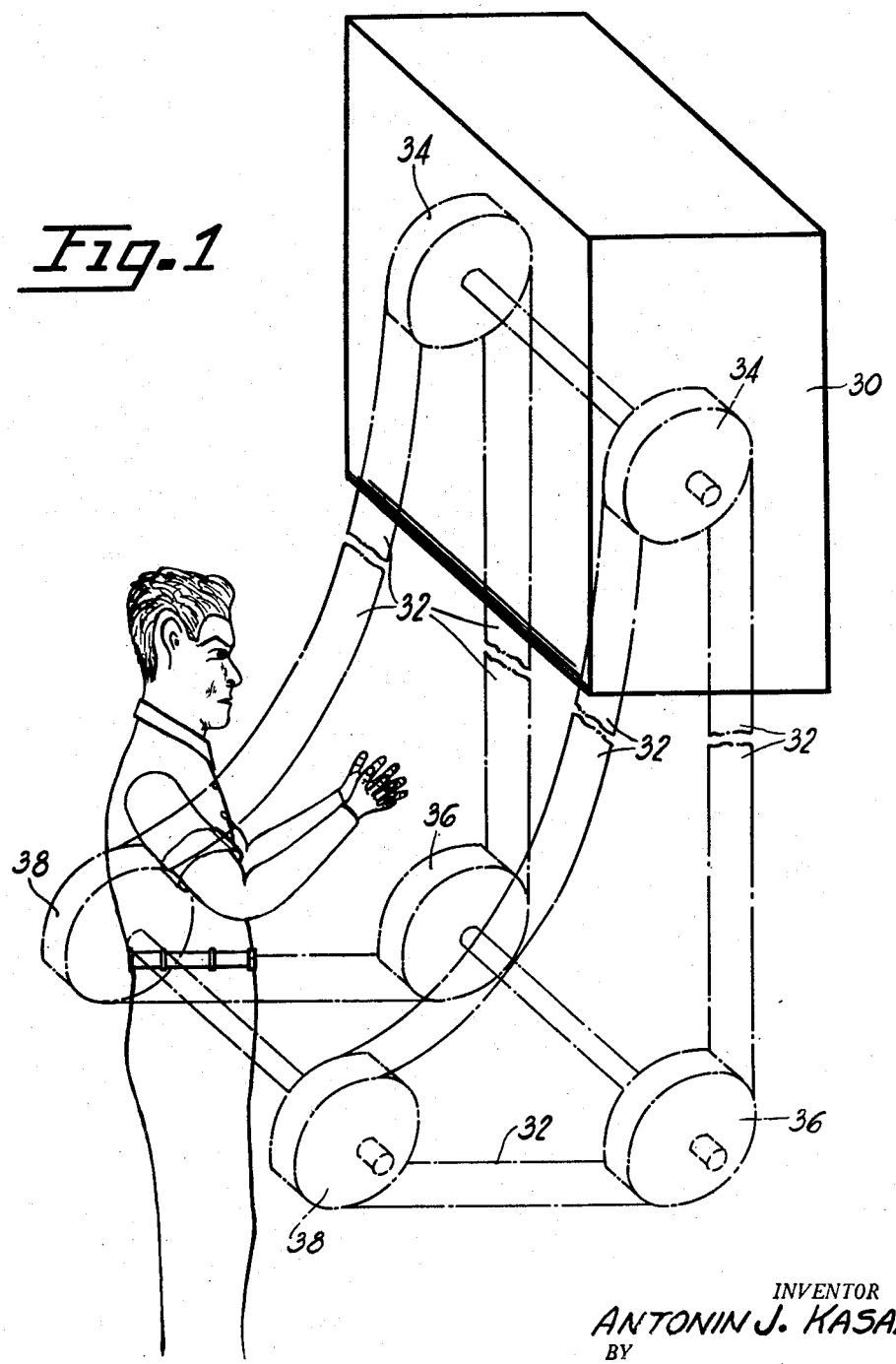
Figure 1 is a diagrammatic illustration of an embodiment of the present invention.
Figure 2:
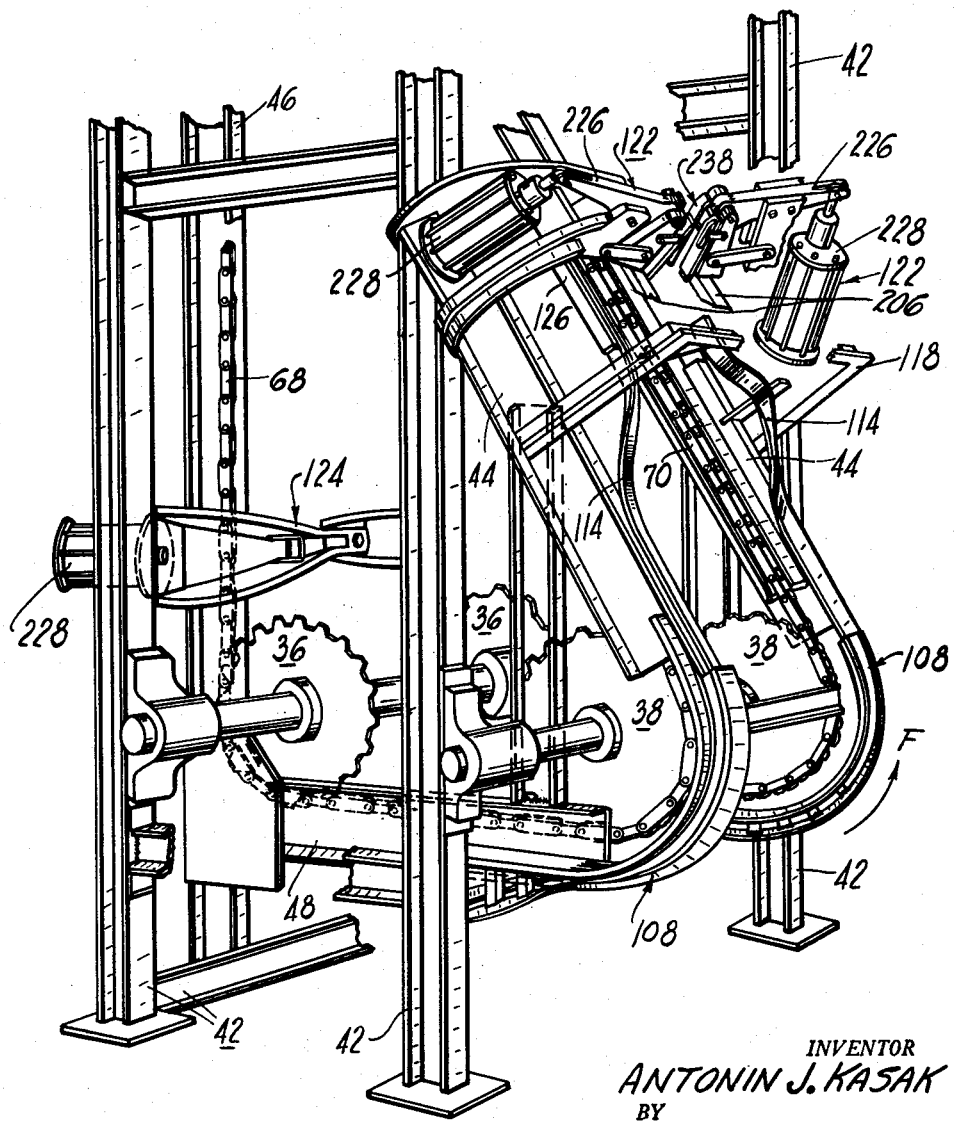
Figure 2 is a partial perspective illustrating the lower front and side portions of the mechanism of this invention, with the bonding fixtures and part of the cam rail construction removed therefrom.
Figure 3:
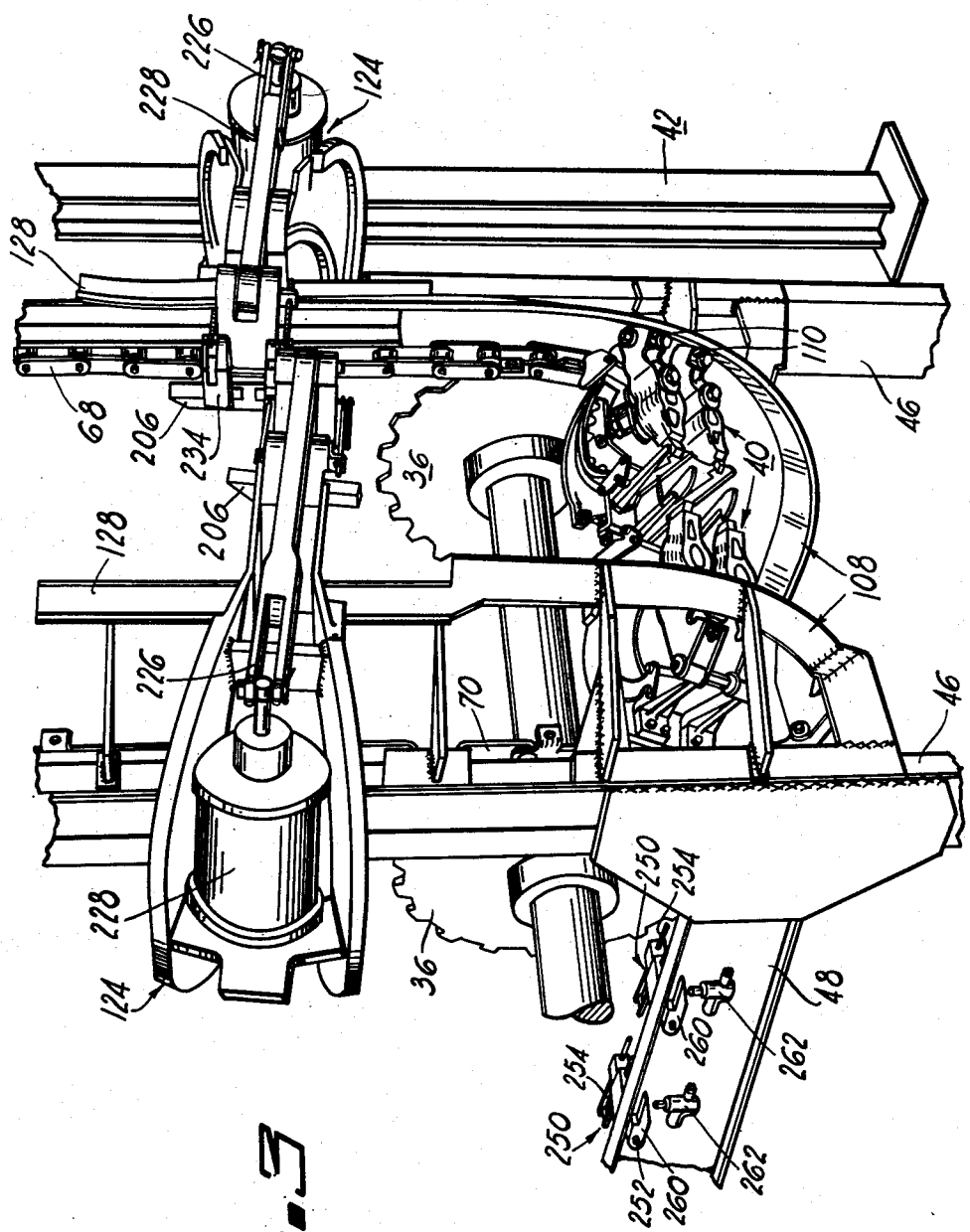
Figure 3 is an illustration similar to Figure 2 but showing the rear and side portions of the mechanism and a few bonding fixtures secured to the mechanism conveyor chain.

Referring now to the drawings and more particularly to Figures 1 to 3, it is seen that the apparatus of the present invention is vertically disposed. Similar prior art devices have been horizontally disposed with the consequence that considerable floor area was needed to accommodate all of the necessary structure. It is obvious that with this invention, a minimum of floor area is needed thereby reserving the use of valuable floor space, ordinarily occupied by prior art devices, for other machinery.

The apparatus generally comprises a heating oven 30 which may project some twenty or thirty feet above the roof of a two story building in which the apparatus may be housed, and a conveyor 32 preferably of the chain and sprocket type which includes a sprocket assembly 34 journaled in the top portion of oven 30 and two lower sprocket assemblies 36 and 38 which are disposed equidistant from and adjacent to the building floor. The operator of the apparatus stands facing the front sprocket assembly 38 (see Figure 1) and performs his duties as hereafter will become apparent.

As previously explained, in bonding lining to a brake shoe, it is advisable to clamp the shoes and linings together with a predetermined pressure before heating. A bonding fixture 40 (see Figure 6) is used for this purpose, and as viewed in Figures 1 to 3 and 5, a succession of these fixtures are secured to conveyor 32 so as to provide an endless chain of fixtures. These fixtures 40 are so arranged that as they are transported along, they will automatically open and close at predetermined locations; e. g. the fixtures will be open when they are directly in front of the operator who merely loads them with shoe and lining assemblies, will close thereafter and remain closed until having passed completely through the oven 30 and have reached the horizontal portion of conveyor 32 between sprockets 36 and 38 where they will open to discharge the bonded shoe and lining assemblies.

The complete apparatus is suitably supported by a vertical frame structure 42, comprised of four upright corner posts, which carries the various sprocket assemblies 34, 36, and 38 and other parts and devices to be hereafter described. As will be seen more clearly in Figures 2, 3, and 8, an auxiliary frame is supported by frame 42 and comprises a front section 44 inclined at approximately 60 degrees with the horizontal, a vertical rear section 46, and a horizontal bottom section 48. Actually, this auxiliary frame determines the path of the conveyor 32 and is provided with conveyor tracks 50 (Figure 8) which receive and guide the chains of conveyor 32.

In order to simplify the description, the mechanism parts or assemblies will now be individually described in detail with an explanation following of the manner of their association with the other mechanism parts.

*Portable brake shoe assembly holding device.—Bonding fixture*

Figure 4:
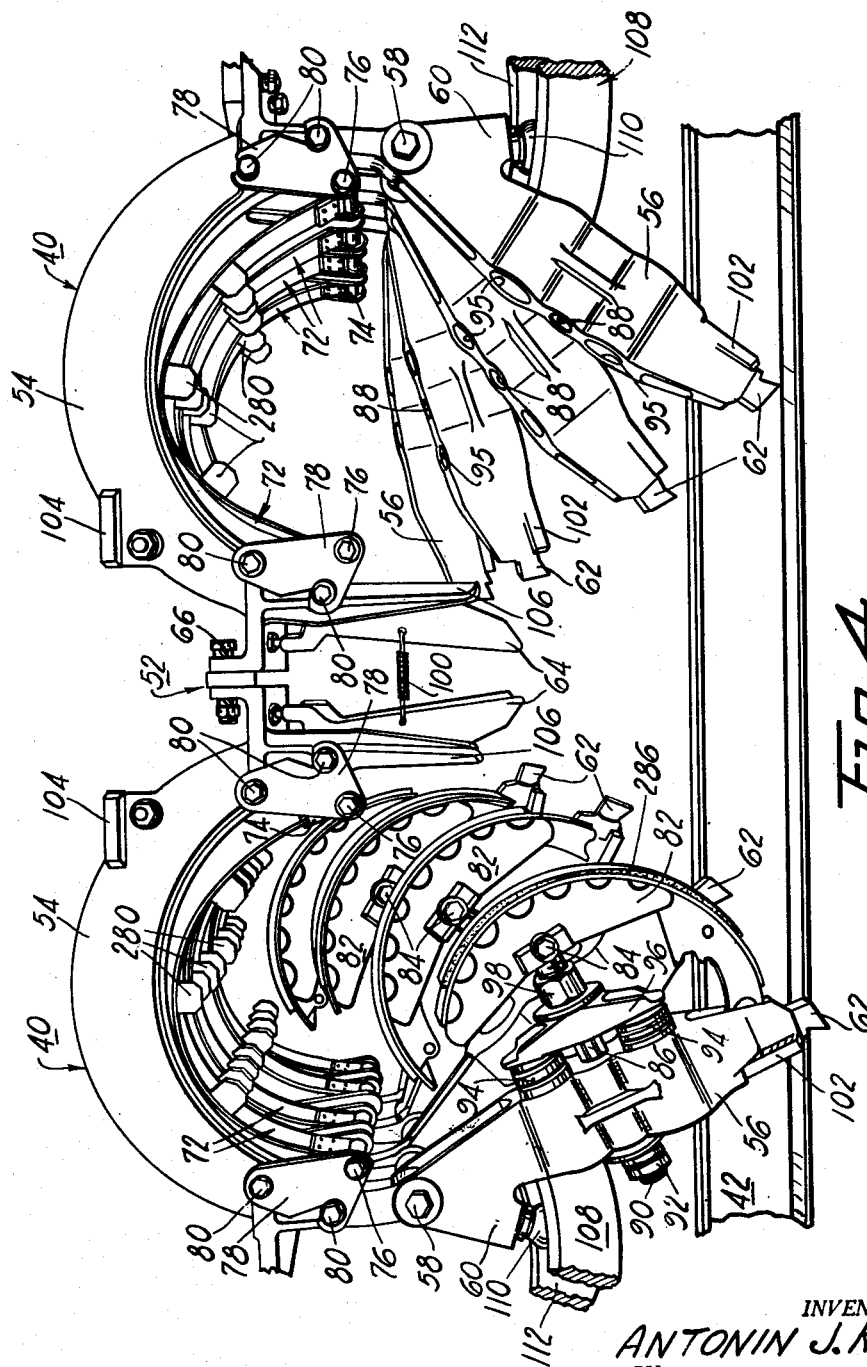
Figure 4 is an elevation of the lower front side of Figure 2 illustrating the action of the successive bonding fixtures as they open to dump the shoe and lining assemblies, certain of the fixtures having parts removed therefrom for purposes of clarity.
Figure 7:
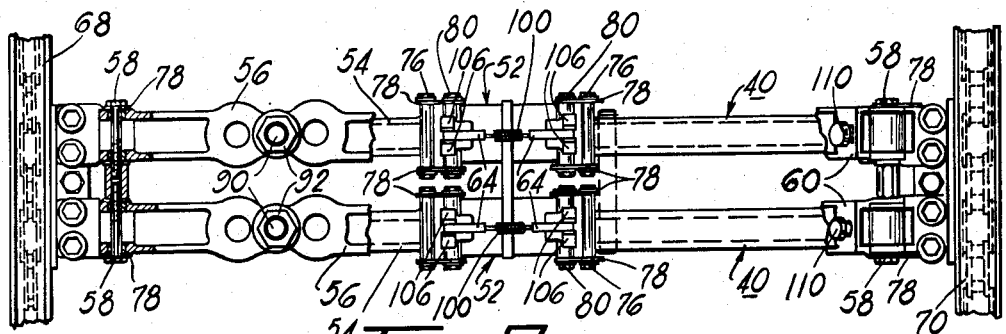
Figure 7 is a top view of two sets of bonding fixtures with certain parts being broken away and certain parts sectioned.
Figure 6:
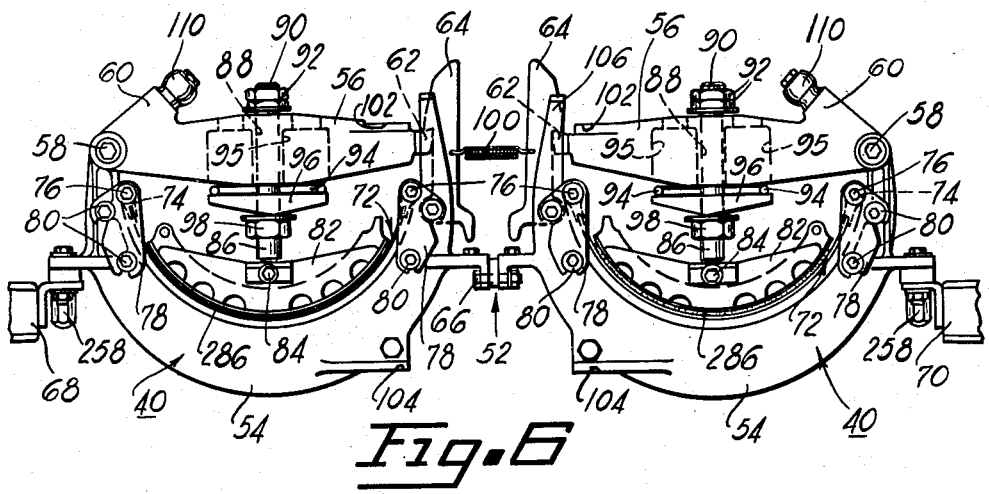
Figure 6 is an elevation of one set of bonding fixtures having shoe and lining assemblies clamped therein.
Figure 12:
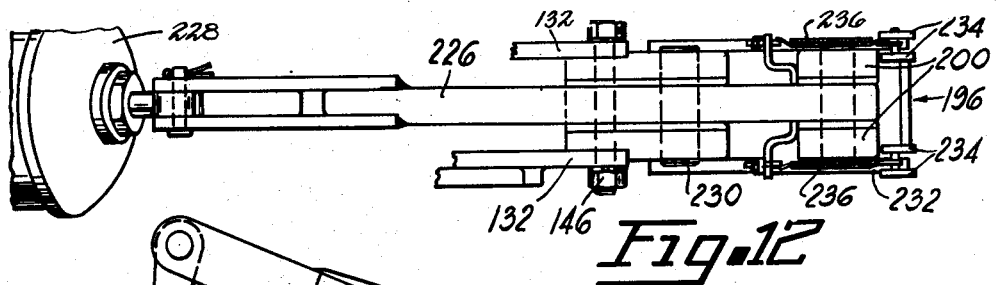
Figure 12 is a top view of the device of Figure 10 with various parts being broken away for clarity.

Reference is now made to the bonding fixtures 40 of Figures 4, 6, and 7, Figure 6 illustrating the manner of securing two fixtures in end-to-end relation to obtain a single fixture set or assembly 52 which is adapted to handle two separate brake shoe and lining assemblies simultaneously. Each fixture 40 comprises a support or C-shaped frame 54 having a bar member or beam 56 pivoted on the outer end 58 thereof. This beam 56 may be pivoted to open as illustrated in Figure 4 and is provided on its pivoted end with a cam follower arm and roller combination 60 which is engaged by a cam rail to be more fully described hereinafter. The inner end of the beam 56 is formed with a tooth 62 which is engaged by a pivoted latch 64 to lock the beam 56 in its illustrated position. To unlock beam 56, the latch 64 is merely pivoted out of engagement with tooth 62. The adjacent ends of two frames 54 are bolted together as at 66 and have their outer ends suitably secured to the chains 68 and 70 of conveyor 32. To obtain structural rigidity, it has been deemed preferable to combine in side-by-side relation two fixture assemblies 52, as viewed in Figure 7, in assembling the fixtures to the conveyor 32, making the endless chain of fixtures 40 consist of successive pairs of fixture assemblies 52. The purpose of this manner of combining fixture assemblies 52 will become apparent hereafter.

Each fixture 40 is provided with a clamping band or backing 72 which is preferably constructed of a strip of flexible spring steel having a width slightly larger than that of a brake lining to be bonded. Apertured fittings or hinge links 74, secured to the ends of this band 72, are received on respective pins 76 supported in parallel spaced relation with the inner surface of the frame 54 by means of pairs of spaced linkage plates 78. These plates 78 are removably secured to the end portions of frame 54 by means of bolts 80. Thus it is observed that each band 72 is cradled in the concave portion of its frame 54 in spaced relation therewith, the amount of spacing being determined by the size of the plates 78 and the spacing of pins 76 from the concave surface of frame 54. It should be understood that this band 72 serves as a backing or reaction member against which a brake shoe and lining assembly may be clamped. Since the band 72 is flexible, it will readily conform to the convex curvature of the brake shoe assembly and serve to equalize the clamping pressure along its entire length; hence, this band 72 may be characterized as an "equalizer."

The clamping mechanism of each fixture 40 comprises a pressure member or clamp 82 which consists of a pair of convexly shaped plates spaced apart to straddle a brake shoe web and rigidly fastened together in any suitable manner. The clamp 82 is universally swivelled at 84 to one end of a pin 86 which is reciprocably received in a transverse opening 88 in the central portion of clamping lever or beam 56. The pin 86 and opening 88 are preferably splined to prevent relative rotation, and the end 90 of pin 86 is provided with nuts 92 to retain the pin 86 in assembled position.

The clamp 82 and beam 56 are normally forced apart by a pair of relatively strong springs 94 fitted into sockets 95 in beam 56 on opposite sides of opening 88 to bear against opposite ends of a yoke 96 which is centrally apertured to receive pin 86. An abutment nut 98 is received on the lower end of pin 86 to be engaged by the yoke 96. As viewed in Figure 6, the brake shoe assemblies are compressed against their respective backings 72 by means of the clamps 82 under the compressive force of the springs 94. It will be obvious that these springs 94 also cooperate with the respective latches 64 to retain beams 56 in their illustrated locked positions. For purposes of convenience in claiming this invention, the combination of beam 56, pin 86, and springs 94 may be characterized as a "pressure developing mechanism" which carries pressure member 82.

The clamping pressure on the shoe assemblies, as derived from springs 94, found to be satisfactory, is approximately one hundred sixty pounds (160) per square inch of lining area. Other pressures of course may be had by adjustment; however, this pressure has produced more nearly the desired bonding result. Inasmuch as this relatively high spring pressure is acting on the engaged latch 64 and tooth 62, a correspondingly high pressure, acting in an opposite direction, is necessary to break the engagement. Therefore, in order to facilitate latching and unlatching tooth 62 and beam 56, the beam 56 and frame 54 are compressed together sufficiently to spread apart the engaging surfaces of the latch and tooth 64, 62. When this break occurs, the latch 64 may be freely rocked out of latching position, and thereafter the beam 56 may be pivoted out of operative engagement with the brake shoe assembly to accommodate the latter's removal.

It should be mentioned here that the universal swivel connection 84 between the clamp 82 and the pin 86 allows the clamp 82 to rock to solidly engage the concave surface of the brake shoe rim. The combination of the band 72 and the rockable clamp 82 provides a reliable, uniform pressure clamping device which will tend not to distort the shape of the brake shoe. Further, the shoe-engaging edge of clamp 82 may be notched or undulated to permit the flow of hot air current therethrough for uniformly heating the brake shoe assembly.

A tension spring 100 is preferably connected between adjacent latches 64 to urge them out of engagement with the respective teeth 62 when the beams 56 are sufficiently depressed.

To facilitate the latching and unlatching action of each fixture 40, a pair of parallel, oppositely disposed compression surfaces are provided, one surface being formed on beam 56 near tooth 62 and indicated by reference numeral 102 and the other surface being similarly formed on the opposite side of frame 54 and being indicated by reference numeral 104. By bringing the jaws of a compressing clamp or vice against these surfaces 102 and 104, the beam 56 may be pivoted inwardly against the forces of the springs 94 to break the engagement of latch 64.

A pair of spaced guide bars 106 are formed on the inner end of each frame 54 and serves to guide tooth 62 and latch 64 into engagement.

*Operating cam for bonding fixture*

The only manual operation required of an operator of the apparatus of the present invention is the loading of the bonding fixtures 40 with brake shoe and lining assemblies. The clamping of these assemblies and their discharge after bonding are automatic. In order for the fixtures 40 to be loaded, they must be open as they round the sprocket assembly 38 (see Figure 8) in the direction of arrow F and remain open for a certain length of their travel as indicated by the letter A.

Upon leaving the loading station A, the fixtures 40 are successively gradually closed by swinging the beams 56 slowly inwardly to clamping position, this gradual swinging action occurring during the travel of the fixtures 40 on conveyor 32. Once closed and latched, the fixtures 40 continue their travels upwardly through the oven 30, around sprocket assembly 34, and downwardly through oven 30. Upon leaving oven 30, the fixtures are unlatched, and immediately following this unlatching, the fixtures are again successively, gradually acted upon to open them, this opening action beginning just prior to their rounding rear sprocket assembly 36 (see Figure 9). Then, in traversing the distance between sprocket assemblies 36 and 38, the fixtures are inverted and are completely opened (see Figure 4), the brake shoe assemblies either falling under the force of gravity, or being knocked from the fixtures. The fixtures now being open, are ready for reloading. Thus it becomes apparent that the above-described function is continuous with the operator performing only the single operation of loading the fixtures.

The mechanism for operating the beams 56 of fixtures 40 consists of a length of snakelike cam rail, generally indicated by reference numeral 108 in Figures 8 and 9, which begins just above sprocket assembly 36, passes around sprocket assemblies 36 and 38, and ends a short distance above sprocket assembly 38. Two cam rails 108 are used with one being suitably secured to the inner side of one auxiliary frame section 44, 46, 48 and the other being similarly secured to the other auxiliary frame section. These rails 108 run generally parallel to adjacent, respective conveyor chains 68 and 70 and conveyor chain tracks 50, but are peculiarly shaped at certain locations as will be described later.

With the fixture assemblies 52 suitably secured to chain 68 and 70, the cam followers 60 thereof are arranged to engage the respective rails 108. Hereafter, since the two rails 108 are formed to substantially the same shape, a description of one will suffice for both. That portion of the rail 108 which passes around sprocket 36, generally indicated by the letter B in Figures 8 and 9, runs substantially parallel to a respective one of the conveyor cains 68 or 70, and is so formed as to be engaged by the roller 110 of fixture follower arm 60. The fixture 40 is in closed but unlatched position as it traverses this portion B and the sole purpose of this portion B is to engage the top side of roller 110 (as viewed in Figure 6) to hold beam 56 in such closed position.

Next, the roller 110 rides in portion C of rail 108 which is preferably channel-shaped; however, the roller 110 engages only the side 112 as viewed more clearly in Figure 4. This portion C is shaped with a 180 degree longitudinal twist to allow the beam 56 to gradually drop open, or fall about its pivot 58, so that by the time the fixture 40 reaches the sprocket assembly 38, it will be completely open and have discharged the brake shoe assembly.

The portion of rail 108 from the end of portion C, around sprocket assembly 38, and through distance A is substantially parallel to the conveyor 32 path and is suitably formed to retain roller 110 in such a position as will hold beam 56 completely open.

The portion D of rail 108 is provided with a 180 or more degree longitudinal twist and is inclined out of parallel relation with conveyor 32. This portion D is preferably formed of a single flat section of steel with the surface 114 being engaged by the fixture roller 110. The purpose of this twist is to pivot the follower arm 60 and the beam 56 about the axis 58 to closed position and prepare the fixture 40 for an immediately subsequent clamping and latching operation.

In order to ease the beams 56 downwardly against the force of gravity as they operatively engage portions D, a pair of let-down cam rails 116 (see Figure 5) are mounted on a frame support 118 (see Figure 2) and are arranged to be slidably engaged by the teeth 62 of beams 56 during the latter's closing. These rails 116 begin adjacent the locations where the teeth 62 reach the upper crest of their swinging movement and terminate adjacent the path of the fixture latches 64. The sole purpose of these cam rails 116 is to provide gradual closure of beams 56, thereby preventing the mislocation of shoe and lining or damage to the fixtures should they be freely allowed to fall into closed position under the force of gravity.

*Bonding fixture latching and unlatching mechanism.—Power clamp*

Figure 5:
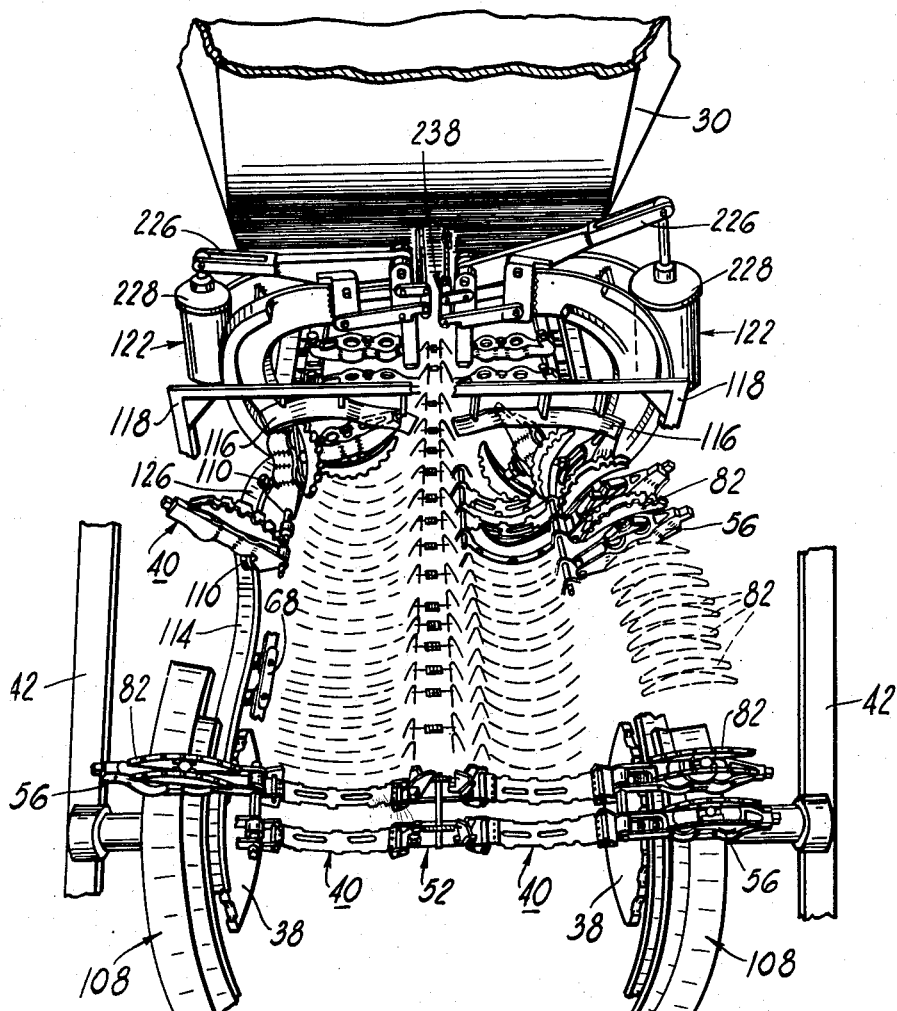
Figure 5 is a fragmental front elevation of Figure 2 showing the succession of bonding fixtures and two clamping devices for the bonding fixtures.
Figure 10:
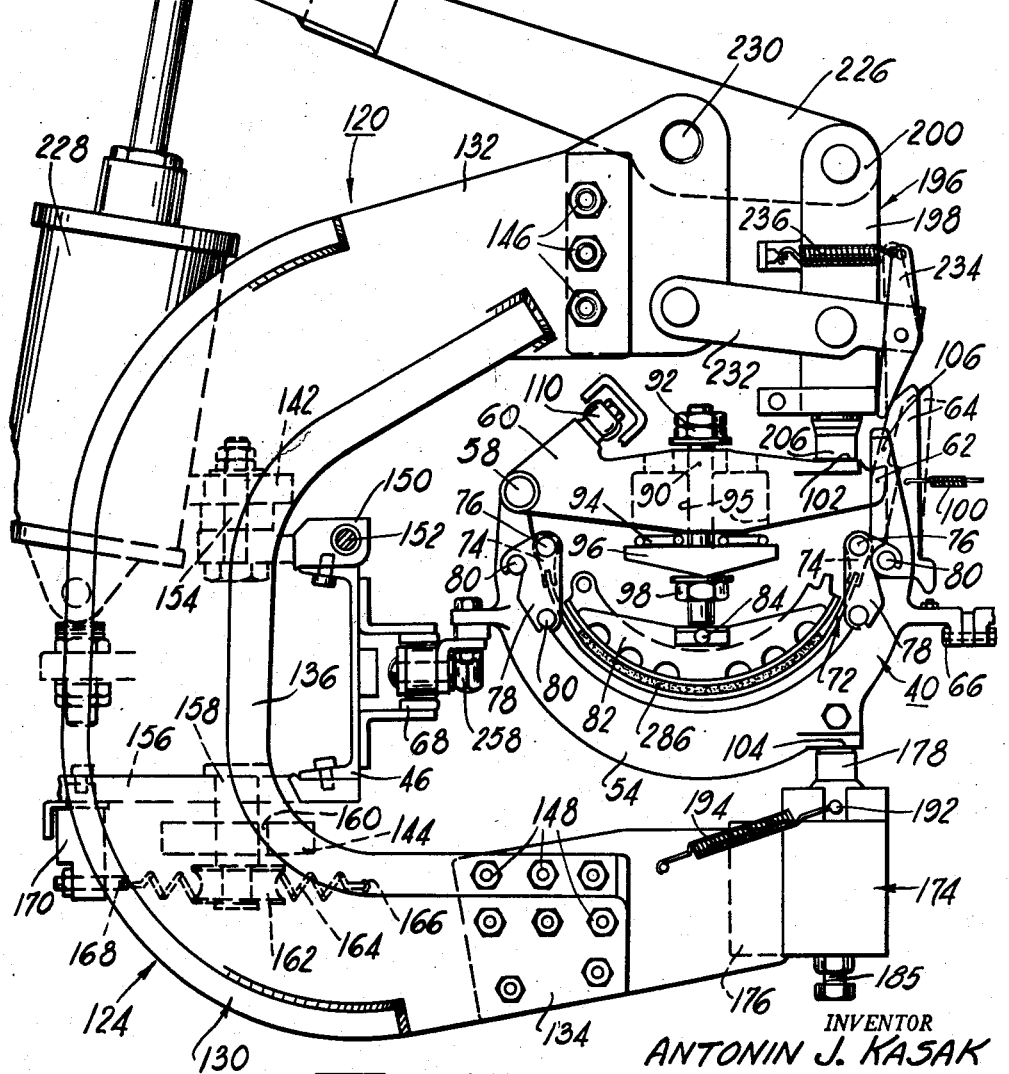
Figure 10 is a side elevation of one power unclamping device as it acts on a bonding fixture.

In Figure 10 is illustrated a fixture-clamping device generally indicated by reference numeral 120, of which there are four, used to effect latching and unlatching of the various bonding fixtures 40 as they pass predetermined locations. The two front clamping devices 122 (see Figures 2 and 5) are supported opposite each other on the inclined portions 44 of the auxiliary frame, each device 122 straddling one row of fixtures 40, as illustrated in Figures 5 and 17, to automatically latch them.

The two rear clamps 124 are also supported opposite each other on the vertical, auxiliary frame portions 46, each of these devices 124 likewise straddling a row of fixtures 40, as illustrated in Figure 10, to automatically unclamp and unlatch them. The front power clamps 122 are supported adjacent the trail end 126 of cam rail 108, while the clamps 124 are supported adjacent the head or entry end 128 of cam rail 108. Hence, the arrangement operates to clamp and latch the fixtures 40 immediately after they leave cam rail end 126 and to unclamp and unlatch them just following their engagement with cam rail end 128.

Aside from the latching and unlatching mechanism, the four clamping devices 122 and 124 are identical, so a description of one will suffice for all.

Referring now to Figure 10 which illustrates the power clamp 124 used on the rear of the present invention as shown in Figure 3, the C-shaped clamp frame 130 is carried by an auxiliary frame member 46. The shape of this frame 130 is formed by two horizontally extending spaced sides 132 and 134 interconnected by means of a rigid, preferably integral, side 136. As illustrated more clearly in Figure 11, frame 130 is made of two C-shaped side sections 138 and 140 which are rigidly secured together by means of spaced, welded supporting plates 142 and 144 (shown in dotted lines in Figure 10) and a plurality of bolts 146 and 148. A plate 150 is hinged to frame member 46 about a pivot 152, and extends between the two sections 138 and 140. This plate 150 is pivotally connected to plate 142 by means of a pin 154 (shown in dotted lines), the axis of which lies in a plane normal to the axis of hinge pivot 152. Thus it is seen that the clamp frame 130 may be tilted or rocked about pivot 152 in the general plane of the frame 130 or may be laterally swung about the pin 154.

A plate-like extension or supporting-member-portion 156 is suitably rigidly secured to the bottom portion of frame or rigid-supporting member 46, as viewed in Figure 10, to project between the C-shaped side sections 138 and 140. Another pivot pin 158 having an axis collinear with the axis of pin 154 is suitably secured to this extension 156 to depend therefrom through an elongated opening 160 in the lower connecting plate 144. The width of this opening 160 is co-extensive with the diameter of pin 158 while the length is in a direction to permit a limited tilt of frame 130 about hinge pivot 152. Journaled on pin 158 immediately below plate 144 is a grooved roller 162 which is engaged on one peripheral side by a tension spring 164 (see Figure 11) connected at one end 166 to frame section 138 and at the other end 168 to an anchoring block 170 suitably secured to depend from extension 156. This spring 164 functions to swivel frame 130 to released position against a stop 172 (see Figure 11) secured to the edge of extension 156 and serves to yieldably retain the clamping device 120 in released position.

The lower side 134 of frame 130 carries a reaction or lower jaw assembly 174 which is illustrated in detail in Figures 13 and 14. This assembly 174 comprises essentially two parts; a retainer block 176 provided with a socket 182, and a T-shaped support block or lower jaw 178 (see Figure 18), the stem 180 of which is rotatably received in socket 182. A thrust bearing 184 is preferably interposed between adjusting screw 185 in the bottom of socket 182 and the end of stem 180, and needle bearings 186 between the sides of socket 182 and the stem 180. The jaw block 178 is retained on block 176 by means of a pair of arcuate plates 188 partially surrounding stem 180 to provide diametrically opposite spaces 190 which receive the opposite ends of a pin 192 transversely secured through the center of stem 180. Thus the swivelling movement of support block 178 is limited by the engagement of pin 192 with the ends of the plates 188. As viewed in Figure 10, a tension spring 194 is connected between one end of pin 192 and side 134 of frame 130 thereby yieldably rotating lower jaw 178 to its stopped position as illustrated in Figure 14.

Referring now more particularly to Figures 10, 15, 16, and 18, the pressure or upper jaw assembly 196 is constructed quite similarly to lower assembly 174. It comprises a pressure-transmitting-member or bar 198 provided on one end with a clevis 200 and in its other end with a longitudinal socket 202 which pivotally receives a stem 204 of T-shaped clamp member or jaw 206. Thrust bearings 208 and needle bearings 210 are used to rotatably support stem 204 in the socket 202. A pair of locking members 212, similar to the plates 188 of Figure 14, are secured to the socket end of bar 198 and are formed with arcuate cutout portions 214 which engage the annular shoulder 216 on stem 204 to retain the latter in place. Similarly to the lower jaw assembly 174, a pin 218 is secured to stem 204 to lie in the spaces 220 formed between the stop members 212. The cooperative function of these stop members 212 and the pin 218 is the same as the similar parts of the lower jaw assembly 174. In order to yieldably retain jaw 206 in the pivoted position illustrated in Figure 16, a spring 222 is compressed between one end of pin 218 and an extension 224 formed on one of the two stop members 212.

Referring to Figures 10 and 18, it is seen that the jaw 206 of the upper jaw assembly 196 and the jaw 178 of the lower jaw assembly 174 are juxtaposed in cooperative relation to engage the surfaces 102 and 104, respectively, of fixtures 40. This upper jaw assembly 196 is supported by means of a lever 226 which is connected at one end to the clevis 200 of bar 198 and at the other end to a pneumatic power cylinder 228. This lever 226 is pivoted intermediate its ends to the end of side 132 at 230 whereby reciprocatory movement of the piston of power cylinder 228 will cause lever 226 to rock about pivot 230, and to raise and lower jaw assembly 196 accordingly.

In order to limit the motion of upper jaw assembly 196 substantially in line with the longitudinal dimension of the bar 198, a linkage 232 is pivotally connected between frame side 132 and the lower portion of bar 198. Thus any movement of jaw assembly 196 is substantially parallel to or in line with the length dimension of bar 198.

It is now obvious that by moving the power-cylinder end of lever 226, the bonding fixture 40 may be clamped between jaws 178 and 206 to depress the beam 56 to latch or unlatch it as previously explained.

The power clamp 124, as shown in Figures 10 and 18, is used to unlatch the fixtures 40. This unlatching action is facilitated by use of the fingers 234 pivoted intermediate their ends to extensions on linkages 232. The upper ends of fingers 234 are connected to bar 198 by means of tension springs 236 which tend to rotate these fingers 234 in a counterclockwise direction.

A pair of latched fixtures 40, as illustrated in Figure 10, are acted upon by this power clamp 124 in the following manner. As the fixtures 40 pass between the spread jaws 178 and 206, the power cylinder 228 is energized to rock lever 226 in a clockwise direction. The jaws 178 and 206 are brought into engagement with the fixture surfaces 104 and 102, respectively, and simultaneously, the lower-tapered end of each finger 234 engages the inner inclined side of the respective fixture latch 64. The combination of the power cylinder 228 and lever 226 is sufficiently powerful to compress the surfaces 102 and 104 toward one another against the action of springs 94 whereupon the engagement between the teeth 62 on beams 56 and the latches 64 are broken allowing the springs 236 and fingers 234 to pivot the latches 64 clockwise out of engagement with the teeth 62. Power cylinder 228 is now oppositely energized, and the jaws 178 and 206 thereby separated to allow the fixtures 40 to continue on their course. The actuation of the power cylinder 228 is automatic and a system for controlling its actuation will be described hereinafter.

Referring now to Figures 2, 5, and 17, the power or latching clamp 122 is illustrated as being provided with a latching mechanism generally indicated by the reference numeral 238. This mechanism 238 is comprised of an elongated cam 240 which is pivotally connected to the upper jaw assembly bar 198 by means of a linkage 242. This cam 240 is provided at its lower end with a longitudinal slot 244 arranged to receive a pin 246 extending laterally from the end of motion-stabilizing linkage 232. A tension spring 247 is connected between the upper end of bar 240 and the pin 246 whereby the cam 240 is yieldably urged downwardly.

Assuming that the latch 64 is disengaged from tooth 62, as illustrated by the dotted lines of latch 64, power cylinder 228 is actuated to compress the fixture surfaces 102 and 104 together. With a downward movement of the upper jaw assembly 196, spring 247, in the latching mechanism 238, draws the cam 240 downwardly until cam surface 248 engages the outer side of latch 64. Once the fixture surfaces 102 and 104 have been pressed sufficiently close together, latch 64 will be rotated counterclockwise by the action of spring 247 and cam surface 248 until the latch overlies the upper surface of tooth 62. The jaws of the power clamp 122 are now released allowing the beam 56 to pivot outwardly under the pressure of springs 94 until the tooth 62 engages and frictionally locks with latch 64.

Figure 18 is a front elevation of the power clamp 124 as it engages two successive bonding fixtures 40. Inasmuch as two fixtures 40 may be acted upon simultaneously, it is desirable to secure two bonding fixture assemblies 52 together as shown in Figure 7 to obtain the required rigidity for the clamping or compressing action.

*Control mechanism*

Figure 21:
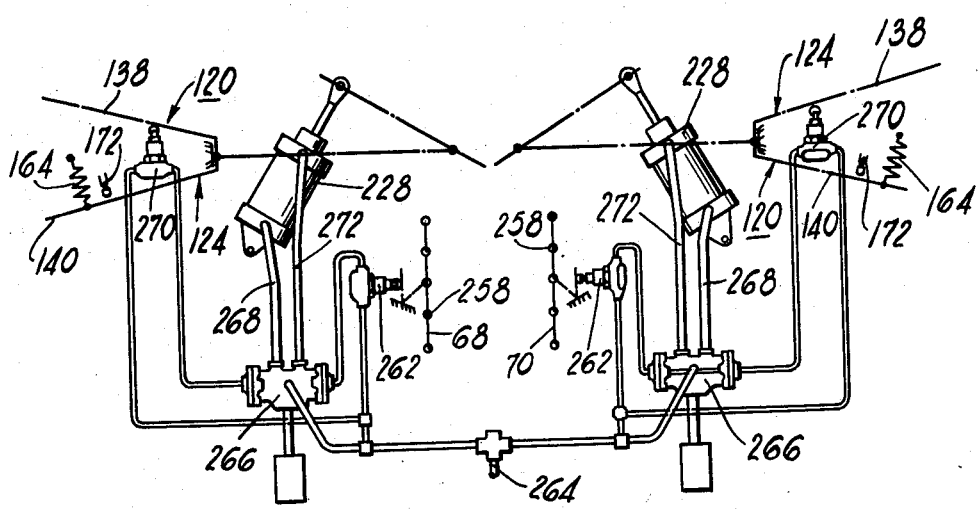
Figure 21 is a diagrammatic illustration of the bonding apparatus control system.

Referring now to Figures 3, 8, and 21, the actuating system for the power clamps 122 and 124 will now be described. Air valve actuating mechanisms are indicated generally by reference numerals 250 and are carried between the sprocket assemblies 36 and 38 by the horizontal frame section 48 of the auxiliary frame. There are two mechanisms 250 carried by each of the two frame sections 48, one mechanism controlling the operation of one power clamp, such as 122, and the other controlling a power clamp 124. Inasmuch as the mechanisms 250 are identical, a description of one will suffice for all.

A pivot shaft 252 is journaled in frame section 48 and is secured on one end to a trip arm 254 which lies parallel and adjacent to the conveyor rail 50. A cam plate 256 is secured on the end of arm 254 and is positioned to be engaged by the cam studs 258 (Figure 6) on bonding fixture assemblies 52. It should be noted that these cam studs 258 are secured on the fixture frames 54 immediately adjacent the conveyor chains 68 and 70, and thereby travel along a predetermined path parallel to the conveyor chain guides 50 (Figure 8). The trip arm 254 positions cam plate 256 in the path of studs 258 whereby the shaft 252 will be rocked each time a stud rides against plate 256. On the other end of shaft 252 is secured a valve-actuating arm 260 which momentarily opens normally closed air valve 262.

Referring now more particularly to Figures 11 and 21, the power clamp 124 is operated in the following manner. The studs 258 are spaced along the conveyor chains 68 and 70 a predetermined distance apart so that as one stud 258 engages a valve actuating mechanism 250, the corresponding valve 262 will open allowing communication of air pressure from source pipe 264 to master control valve 266 which routes this pressure through conduit 268 to power cylinder 228. The piston in power cylinder 228 is thereby forced outwardly to operate power clamp 124 and to clamp a pair of fixtures 40 as explained previously. The cam studs 258 are spaced to synchronize the actuation of power clamp 124 with the passing of a pair of fixtures between the power clamp jaws 178 and 206. The power clamp 124 is normally pivoted against its stop 172 (see Figure 11) by spring 164, and the moment this clamp 124 grasps a pair of fixtures 40, the jaws 178 and 206 are necessarily carried along with the fixtures. This pivots clamp 124 about pins 154 and 158 and jaws 178 and 206 pivot in their respective sockets 182 and 202 (see Figures 13 and 15).

Inasmuch as it is necessary for clamp 124 to remain engaged with the fixture 40 only long enough for them to be unlatched, a valve is arranged to be actuated after a certain pivotal movement of the clamp 124 to release the fixtures 40 and allow the pivotal return of clamp 124 against its stop 172 by spring 164. Thus, the clamp 124 is readied for another fixture-engaging action. This releasing valve is indicated by reference numeral 270 and is preferably secured to extension 156 of vertical frame section 46. As clamp 124 rotates in a clockwise direction, as viewed in Figure 11, concomitant with the travel of the clamped fixtures 40, it eventually engages and operates valve 270 which is opened (see Figure 21) to send air pressure to master control valve 266 which operates to exhaust the pressure in power cylinder 228 and to connect tube 272 with the other end of power cylinder 228 to force the piston inwardly and open the clamp jaws 178 and 206. Thus when these jaws 178 and 206 are disengaged from the fixtures 40, the return spring 164 pivots the power clamp 124 to released position against stop 172.

This clamping and unclamping cycle repeats itself for each pair of fixtures 40 which passes between the power clamp jaws, and the four power clamps 122 and 124 are individually operated as predetermined by the spacing of cam studs 258 and the locations of the four valve actuating mechanisms 250. With this particular control system, it is obvious that a single mechanism 250 in combination with one master air valve 266 serves only one power clamp 122 or 124.

*The bonding fixture clamping band*

The clamping band 72 in Figure 6 is more clearly illustrated in Figures 19 and 20. This band 72 consists of two parts, the first being a master band 274 and the second a locator band 276 which is removably secured to one surface of master band 274. Master band 274 is preferably formed of a strip of flexible spring steel having relatively high tensile strength and is provided on its ends with hinge plates 74 adapted to receive through the openings 278 thereof the respective pins 76.

The locator band 276 is preferably a stamping formed to an arcuate shape and with a plurality of longitudinally spaced ears 280 on the longitudinal edges thereof. As viewed in Figure 22, each ear 280 is bent to provide stepped portions 282 and 284, portion 282 being offset outwardly from portion 284. The length of portion 284 is formed coextensive with the normal thickness of a brake lining segment 286 and the distance across the band between these portions 284 of opposite ears 280 is made equal to the normal width of the lining segment 286. Thus the lining segment may be laterally positioned with respect to band 276. The rim 288 of a T-section brake shoe is similarly laterally positioned by the ear portions 282. The lining 286 is longitudinally positioned by means of an abutment 290 on one end of band 276 while the corresponding end of the brake shoe rim 288 is likewise placed against a similar abutment 292 thus completing the operation of locating the lining segment 286 with respect to shoe rim 288.

The locator band 276 has one end formed to fit in a transverse slot 294 in one hinge plate 74, and its other end engaged by the head of a cam screw 296 fitted to the other hinge plate 74. The head of screw 296 is formed with one flat side so that by rotating this screw 180 degrees from its illustrated position, the engagement with the end of band 276 will be freed thereby allowing the latter band's ready removal.

*Operation*

The foregoing description of the embodiment of the present invention has included the operation thereof; however, a brief review of this operation will now be given.

The arrow F in the various figures (see Figure 2) indicates the direction of travel of conveyor 32. As the fixture assemblies 52 round sprocket assembly 38 and pass in front of the operator (see Figure 1) the fixtures are open and ready for loading. The operator first positions a lining segment, such as the one 286 of Figure 22, on the clamping band 72 and then a brake shoe on top of the segment. Thereafter the operations of this invention are automatic with the loaded fixtures being first closed by the surface 114 of cam rail 103 (see Figure 8) and then clamped and latched by power clamps 122. The brake shoe and lining assemblies in the latched fixtures 40 are now pressed together under sustained pressure and are transported upwardly and then downwardly through oven 30. Immediately upon leaving the oven, the fixtures are unclamped and unlatched by power clamps 124 (an unlatching power clamp is illustrated in Figure 10), and thereafter operatively engage the cam rails 108 which cause the fixtures to swing open as they pass inverted between lower sprocket assemblies 36 and 38 to dump the brake shoe assemblies. The fixtures, now being open, are ready to accept other brake shoe assemblies.

Although only one embodiment of the invention has been illustrated and described, various changes in the form and relative arrangements of the parts may be made to suit requirements.

I claim:

1. An apparatus for developing pressure comprising a rigid support having two spaced sides providing end connecting portions, a supporting section provided on one of said connecting portions and having a socket, a first jaw member consisting of a support block and a stem which projects into said socket, a first pivot limiting means secured to said supporting section and partially surrounding said stem, a pin transversely projecting through said stem, said pivot limiting means being provided with diametrically opposite cutaway portions which loosely receive the ends of said pin to allow said stem only limited pivotal movement in its socket, a lever fulcrumed on the other of said connecting portions, a pressure-transmitting member having a socket and being pivotally connected to one end of said lever, a second jaw member consisting of a pressure block and a stem, said latter stem having a shoulder portion adjacent said pressure block and being pivotally received in said pressure-transmitting-member socket, a locking means secured to said pressure-transmitting member and engaging said shoulder to hold said latter stem in its socket, a second pin transversely projecting through said latter stem, said locking means being provided with diametrically opposite cutaway portions which loosely receive the ends of said second pin to allow said second stem only limited pivotal movement in its socket, said jaw members being positioned with respect to each other to clamp an object therebetween, and a link pivotally connected between said pressure-transmitting member and said other connecting portion acting in conjunction with said lever to permit only substantially translatory motion of said pressure-transmitting member.

2. An apparatus for developing pressure comprising a rigid support having two spaced sides providing end connecting portions, a supporting section formed on one of said connecting portions and having a socket, a first jaw member consisting of a support block and a stem, said stem being pivotally received by said socket, a pivot limiting means secured to said section and partially surrounding said stem, a pin transversely projecting through said stem, said pivot limiting means being provided with diametrically opposite cutaway portions which loosely receive the ends of said pin whereby said stem is capable of only limited pivotal movement in its socket, a lever fulcrumed on the other of said connecting portions, a pressure-transmitting member having a socket and being pivotally connected to one end of said lever, a second jaw member consisting of a pressure block and a stem, said latter stem having a shoulder portion adjacent said pressure block and being pivotally received in said pressure-transmitting member socket, a locking means secured to said pressure-transmitting member and engaging said shoulder to hold said latter stem in its socket, a second pin transversely projecting through said latter stem, said locking means being provided with cutaway portions which loosely receive the ends of said second pin whereby said second stem is capable of only limited pivotal movement in its socket, spring means associated with each of said pins biasing the respective stems in one pivotal direction, said jaw members being positioned with respect to each other to clamp an object therebetween, and a link pivotally connected between said pressure-transmitting member and said other connecting portion acting in conjunction with said lever to permit only substantially translatory motion of said pressure-transmitting member.

3. An apparatus for developing pressure comprising a C-shaped frame having two interconnected side sections, two spaced supporting plates rigidly connecting said sections together, hinge post means operatively connected to said plates for providing one axis of pivot for said frame, hinge structure operatively secured to one of said plates and arranged to support said frame for pivotal movement about an axis normal to the general plane of said frame and the other of said plates being arranged to allow only a predetermined amount of such pivotal movement, a reaction member provided on one end of said frame, a first jaw member pivotally carried by said reaction member, a lever fulcrumed on the other end of said frame, a pressure-transmitting member pivotally connected to one end of said lever, a second jaw member pivotally carried by said pressure-transmitting member, said jaw members being positioned with respect to each other to clamp an object therebetween, and a link pivotally connected between said pressure-transmitting member and said other end of said frame acting in conjunction with said lever to permit only substantially translatory motion of said pressure-transmitting member.

4. An apparatus for developing pressure comprising a C-shaped frame having two interconnected side sections, two spaced supporting plates rigidly connecting said sections together, a rigid-supporting member having a portion extending between said side sections and said supporting plates, a first hinge post pivotally connecting one of said supporting plates to said rigid-supporting member portion, means provided on said one plate permitting limited rocking movement of said frame in a plane generally defined by said frame, a hinge plate operatively connected to said rigid-supporting member and projecting between said side sections, a second hinge post having an axis substantially collinear with the first hinge post axis and pivotally connecting the other of said supporting plates to said hinge plate, said hinge plate being swingable to provide the aforementioned rocking movement of said frame in its generally defined plane, said hinge posts supporting said C-shaped frame on said rigid-supporting member, return spring means fastened between said frame and said rigid-supporting member for yieldably urging said frame to pivot in one direction about the axis of said hinge posts, and coacting jaw members carried by the ends of said frame adapted to clamp an object therebetween.

5. An apparatus for developing pressure comprising a substantially upright C-shaped frame having two interconnected side sections, two vertically spaced supporting plates rigidly connecting said sections together, a rigid-supporting member having a portion extending between said side sections and said supporting plates, a first hinge post pivotally connecting one of said supporting plates to said rigid-supporting member portion, means provided on said one plate permitting limited rocking movement of said frame in a plane generally defined by said frame, a hinge plate operatively connected to said rigid-supporting member and projecting between said side sections, a second hinge post having an axis substantially collinear with the first hinge post axis and pivotally connecting the other of said supporting plates to said hinge plate, said hinge plate being swingable to provide the aforementioned pivotal movement of said frame in its generally defined plane, said hinge posts providing vertical support for said frame on said rigid-supporting member, return spring means fastened between said frame and said rigid-supporting member for yieldably urging said frame to pivot in one direction about the axis of said hinge posts, coacting jaw members carried by the ends of said frame adapted to clamp an object therebetween, and a motor device operatively associated with said jaw members for actuating them into and out of clamping relation.

6. A brake shoe assembly clamping mechanism comprising a bonding fixture having a pressure beam, a latching device on said fixture selectively engageable with said beam to secure it in position, a pressure-developing device cooperatively associated with said fixture and having a set of clamping jaws, said jaws being engageable with said beam and another portion of said fixture to compress the beam and the other fixture portion toward one another, and a cam member operatively secured to said pressure-developing device and adapted to urge said latching device into locking relation with said beam after said jaws have acted to compress said beam toward said other portion of said fixture.

7. A brake shoe assembly clamping mechanism comprising a bonding fixture having a pressure beam fulcrumed at one end thereon, a latch pivoted on said fixture engageable with the end of said beam remote from its fulcrum to selectively lock said beam in position, a pressure-developing device cooperatively associated with said fixture and having a set of clamping jaws, said jaws being engageable with said beam and another portion of said fixture to compress the beam and the other fixture portion toward one another, and a cam member operatively secured to said pressure-developing device and adapted to urge said latch into locking relation with said beam after said jaws have acted to compress said beam toward said other portion of said fixture.

8. A brake shoe assembly clamping mechanism comprising a bonding fixture having a pressure beam fulcrumed at one end thereon, a latch pivoted on said fixture engageable with the end of said beam remote from its fulcrum to secure said beam in position, a pressure-developing device cooperatively associated with said fixture and having two connected spaced sides, a reaction member provided on one of said sides, a pressure-transmitting member operatively secured to the other of said sides, said pressure-transmitting member being engageable with said beam while the reaction member engages another portion of said fixture to compress the beam and other fixture portion toward one another, and a cam member having a pivotal connection and a resilient connection with said pressure-transmitting member, said cam member being engageable with said latch and operable under the influence of said resilient connection to urge said latch into locking relation with said beam after said reaction and pressure-transmitting members have acted to compress said beam and other fixture portion together.

9. A brake shoe assembly clamping mechanism comprising a bonding fixture having a pressure beam fulcrumed at one end thereon, a latch pivoted on said fixture engageable with the end of said beam remote from its fulcrum, spring means acting on said beam, said latch and said spring means cooperating to lock said beam in position, a pressure-developing device mounted to act on said fixture and having two rigidly connected spaced sides which straddle said fixture, a reaction member provided on one end of said sides, a pressure-transmitting member operatively connected to the other of said sides, said pressure-transmitting member being engageable with said beam while the reaction member engages another portion of said fixture to compress the beam and other fixture portion toward one another, a cam member, a first link pivotally connecting said cam member to said pressure-transmitting member, a second link pivotally connected between its ends to said pressure-transmitting member and at one end to said other of said sides, said cam member having a guide slot whose length dimension extends in the direction of movement of said cam member, the remaining end of said second link having a laterally extending pin fitting into said slot, and a tension spring connecting said laterally extending pin to one end of said cam member urging said cam member in a direction to engage and urge said latch into locking relation with said beam after said reaction and pressure-transmitting members have acted to compress said beam and other fixture portion together.

10. A brake shoe assembly clamping mechanism comprising a bonding fixture having a frame and a pressure beam fulcrumed on one end thereof, a latch pivoted on the other end of said frame and engageable with the end of said beam remote from its fulcrum, spring means arranged to act between said beam and said frame to urge the two apart, said latch and said spring means cooperating to lock said beam in position, a pressure-developing device mounted to act on said fixture and having two connected spaced sides which straddle said fixture, a reaction member provided on one end of said sides, a pressure-transmitting member operatively secured for substantially translatory movement to the other of said sides, said pressure-transmitting member being arranged to engage said beam while the reaction member engages the side of said fixture frame remote from said beam to compress said beam toward this remote side of said frame, and a cam member operatively secured to said pressure-transmitting member and adapted to engage and urge said latch into locking relation with said beam after said reaction and pressure-transmitting members have acted to compress said beam toward said fixture frame.

11. A brake shoe assembly clamping mechanism comprising a bonding fixture having a frame and a pressure beam fulcrumed on one end thereof, a latch pivoted on the other end of said frame and arranged to engage and lock said beam in position on said frame, a pressure-developing device arranged to act on said fixture and having two spaced substantially parallel sides rigidly connected together by means of a connecting portion, said connecting portion being hinged about an axis substantially normal to said sides, said sides straddling said fixture, a reaction member provided on one of said sides, a pressure-transmitting member operatively secured to the other of said sides, said pressure-transmitting member being arranged to engage said beam while the reaction member engages the side of said fixture frame remote from said beam to compress said beam toward this remote side of said frame, and a cam member operatively secured to said pressure-transmitting member and arranged to engage and urge said latch into locking relation with said beam after said reaction and pressure-transmitting members have acted to compress said beam toward said fixture frame.

12. A brake shoe assembly clamping mechanism comprising a bonding fixture having a frame and a pressure beam fulcrumed on one end thereof, a latch pivoted on the other end of said frame and arranged to engage and lock said beam in position on said frame, conveyor means for transporting said fixture along a predetermined path, a pressure-developing device adapted to act on said fixture and having two spaced substantially parallel sides rigidly connected together by means of a connecting portion, said connecting portion being hinged about an axis substantially normal to said sides, said sides straddling said fixture, a reaction member provided on one of said sides and having a swivelling-support surface, a pressure-transmitting member operatively secured to the other of said sides and having a swivelling-surface-of-engagement, said surface-of-engagement being adapted to engage said beam while said swivelling-support surface engages the side of said fixture frame remote from said beam to compress said beam toward this remote side of said frame, said pressure-developing device being capable of swinging about its aforementioned hinge axis during the aforementioned compressing action while said fixture is being transported along by said conveyor means, and a cam member operatively secured to said pressure-transmitting member and arranged to urge said latch into locking relation with said beam after said reaction and pressure-transmitting members have acted to compress said beam toward said fixture frame.

13. A brake shoe assembly clamping mechanism comprising a bonding fixture having a frame and a pressure beam fulcrumed on one end thereof, a latch pivoted on the other end of said frame and adapted to engage and lock said beam in position on said frame, conveyor means for transporting said fixture along a predetermined straight path, a pressure-developing device adapted to act on said fixture and having two spaced substantially parallel sides rigidly connected together by means of a connecting portion, said connecting portion being hinged about an axis substantially normal to said sides, said sides straddling said fixture, a reaction member provided on one of said sides and having a first jaw member swivelled thereon, a pressure-transmitting member operatively secured to the other of said sides and having a second jaw member swivelled thereon, said jaw members being adapted to engage said beam and said fixture frame to compress the two toward one another, said pressure-developing device being capable of swinging about its hinge axis during the aforementioned compressing action while said fixture is being transported along by said conveyor means, and a cam member operatively secured to said pressure-transmitting member and adapted to urge said latch into locking relation with said beam after said reaction and pressure-transmitting members have acted to compress said beam toward said fixture frame.

14. A brake shoe assembly clamping mechanism comprising a bonding fixture having a frame and a pressure beam fulcrumed on one end thereof, a latch pivoted on the other end of said frame and adapted to engage and lock said beam in position on said frame, conveyor means for transporting said fixture along a predetermined path, a pressure-developing device adapted to act on said fixture and having two spaced substantially parallel sides rigidly connected together by means of a connecting portion, said connecting portion being hinged about an axis substantially normal to said sides, said sides straddling said fixture and being further hinged about an axis substantially normal to the general plane defined by said sides, a reaction member provided on one of said sides and having a swivelling-support surface, a pressure-transmitting member operatively secured to the other of said sides and having a swivelling-surface-of-engagement, said surface-of-engagement being adapted to engage said beam while said swivelling-support surface engages the side of said fixture frame remote from said beam to compress said beam toward this latter mentioned side of said frame, said pressure-developing device being capable of swinging about its hinges during the aforementioned clamping action while said fixture is being transported along by said conveyor means, and a cam member operatively secured to said pressure-transmitting member and adapted to urge said latch into locking relation with said beam after said reaction and pressure-transmitting members have acted to compress said beam toward said fixture frame.

15. A brake shoe assembly clamping mechanism comprising a bonding fixture having relatively movable portions arranged to squeeze therebetween a brake shoe and lining assembly, a pressure-developing device cooperatively associated with said fixture and having a set of clamping members, said clamping members being engageable with said relatively movable portions of said fixture to compress said portions together, a latching device operatively connected to said fixture to lock said portions in predetermined relation, and cam means operatively secured to said pressure-developing device to engage and actuate said latching device.

16. A brake shoe assembly clamping mechanism comprising a bonding fixture having relatively movable portions adapted to squeeze therebetween a brake shoe and lining assembly, a pressure-developing device cooperatively associated with said fixture and having a set of clamping members, said clamping members being engageable with said relatively movable portions of said fixture to compress said portions together, a latching device operatively connected to said fixture to lock said portions in predetermined relation, and a cam member operatively secured to said pressure-developing device and adapted to urge said latching device out of locking relation after said members have acted to compress said portions together.

17. A brake shoe assembly clamping mechanism comprising a bonding fixture having a pressure beam fulcrumed at one end thereon, a latch pivoted on said fixture engageable with the end of said beam remote from its fulcrum to secure said beam in position, a pressure-developing device cooperatively associated with said fixture and having two spaced sides secured together, a reaction member provided on one of said sides, a pressure-transmitting member operatively secured to the other of said sides, said pressure-transmitting member being engageable with said beam while the reaction member engages another portion of said fixture to compress the beam and other fixture portion toward one another, and a cam member having a pivotal connection and a resilient connection with said pressure-transmitting member, said cam member being engageable with said latch and operable under the influence of the aforementioned resilient connection to urge said latch out of locking relation with said beam after said reaction and pressure-transmitting members have acted to compress said beam and other fixture portion together.

18. A brake shoe assembly clamping mechanism comprising a bonding fixture having a pressure beam fulcrumed at one end thereon, a latch pivoted on said fixture engageable with the end of said beam remote from its fulcrum, spring means acting on said beam, said latch and said spring means cooperating to lock said beam in position, a pressure-developing device mounted to act on said fixture and having two connected spaced sides which straddle said fixture, a reaction member provided on one end of said sides, a pressure-transmitting member operatively secured to the other of said sides, said pressure-transmitting member being engageable with said beam while the reaction member engages another portion of said fixture to compress the beam and other fixture portion toward one another, a cam member having a pivotal link connection with said pressure-transmitting member, a spring connection between said cam member and said pressure-transmitting member urging said cam member in a direction to engage and urge said latch out of locking relation with said beam after said reaction and pressure-transmitting members have acted to compress said beam and other fixture portion together.

References Cited in the file of this patent

UNITED STATES PATENTS

| Number | Name | Date |
| --- | --- | --- |
| 707,442 | Moon | Aug. 19, 1902 |
| 944,140 | Mielenz | Dec. 21, 1909 |
| 1,150,040 | Kuhn | Aug. 17, 1915 |
| 1,281,091 | Spillane | Oct. 8, 1918 |
| 1,786,440 | Maynard | Dec. 30, 1930 |
| 1,865,916 | Jolley | July 5, 1932 |
| 2,353,891 | Gruntorad | July 18, 1944 |
| 2,546,458 | Launder | Mar. 27, 1951 |

OTHER REFERENCES

Bonding Equipment, publication; Grizzly Saftibond Brake Lining, Grizzly Manufacturing Company, Paulding, Ohio, July 1949; 12 pages; page 8 relied upon.